Nov. 9, 1965  R. A. OSWALD  3,217,098
METHOD OF POLICING HORSE RACES
Filed Aug. 29, 1962  2 Sheets-Sheet 1
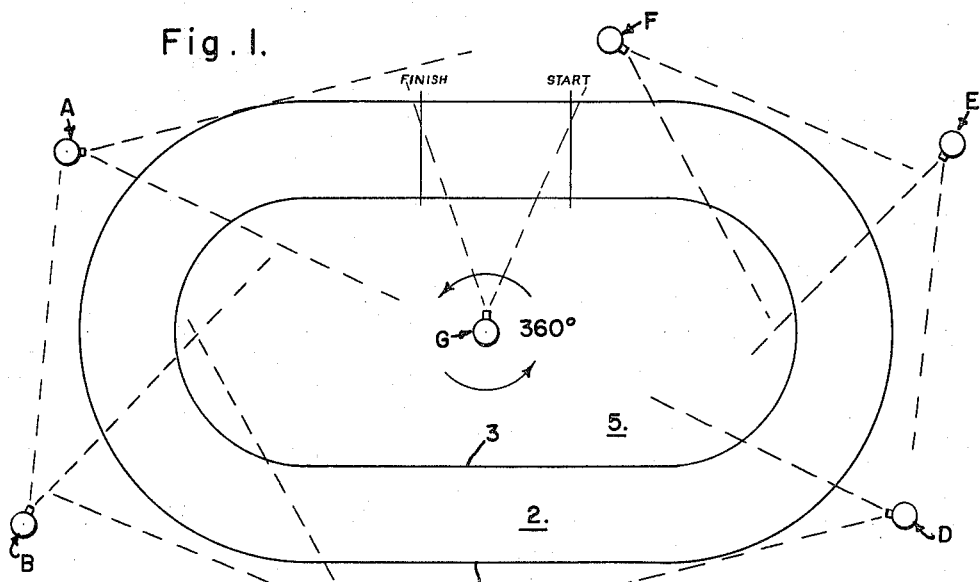
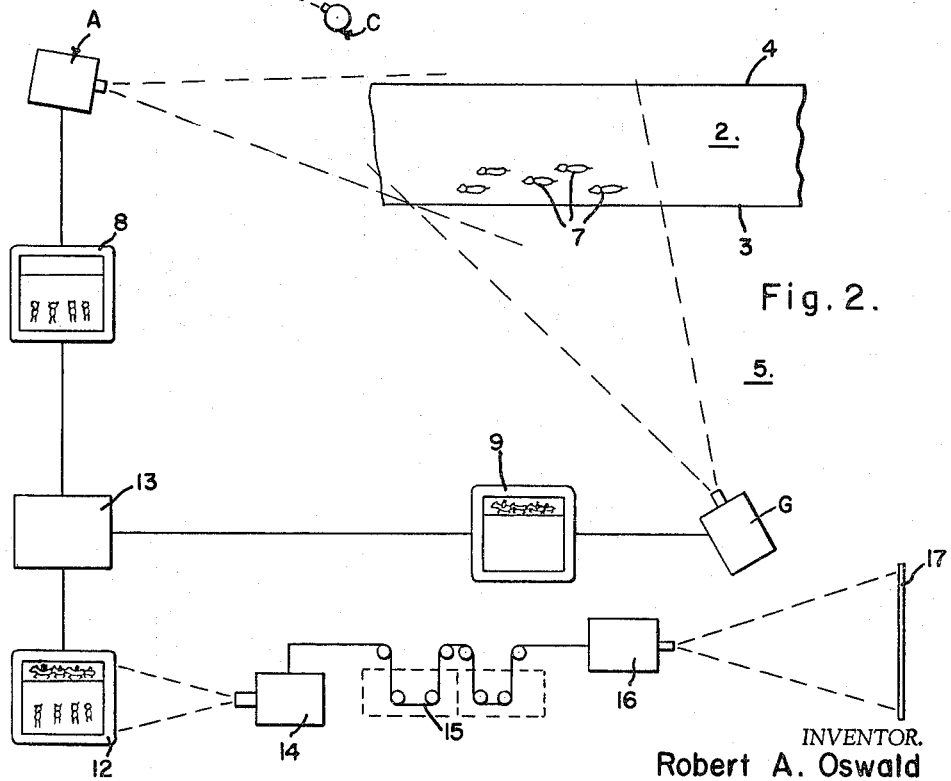
INVENTOR.
Robert A. Oswald

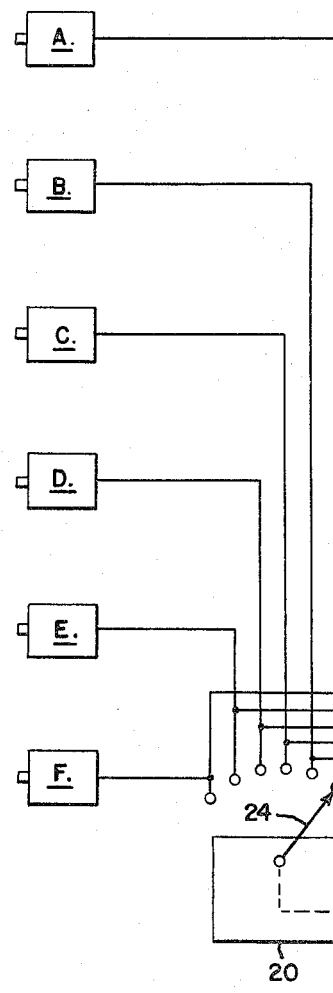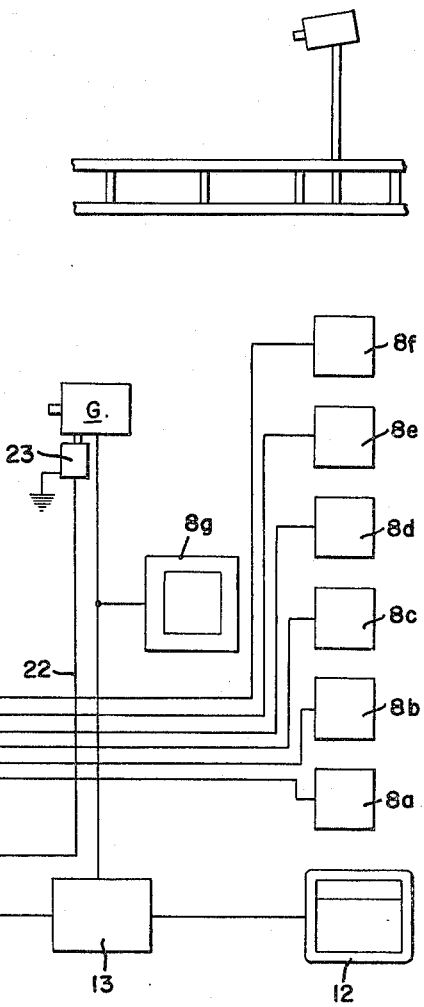

United States Patent Office 3,217,098
Patented Nov. 9, 1965

3,217,098
METHOD OF POLICING HORSE RACES
Robert A. Oswald, 5701 W. Adams Blvd.,
Los Angeles 16, Calif.
Filed Aug. 29, 1962, Ser. No. 220,319
9 Claims. (Cl. 178—6)

This invention relates to a method and means for policing horse races and other races of a like nature held within a generally oval track and wherein the contestants race around the track defined by inner and outer rails or barriers thus forming a race pathway.

This invention provides a means for photographically recording the racing contestants around an oval track in order that any infractions of racing rules might be easily and accurately displayed for the benefit of the judges of the race. At the present time photographic recordation of races is performed both by film and also by television camera in order to determine rule infractions of contestants.

It is a specific object of the present invention to provide a record of the contestant images wherein the contestants are viewed on the same photographic picture frame both from a head-on position as well as from a side view position. The value of such an image showing both positions of the contestants is to enable judges to determine the exact nature and time of rule infractions which might be otherwise ascertainable when viewed from a head-on position or from a side or silhouette position.

It is an object of the present invention to provide a continuous photographic record of the contestant images during the entire race wherein the contestants are viewed on the same photographic frame both from a predominantly head-on position as well as from a side view position. The images thus viewable are automatically synchronized so that the contestants are seen from side position as well as head-on simultaneously; whereby, such an image showing both positions of the contestants will enable judges to determine infractions which might be viewable only from a head-on position or from a side or silhouette position.

It is an object of this invention to provide a photographic reproduction of racing contestants around an oval track wherein the contestants are viewed continuously from a head-on position and from a position located on the average of approximately 90° from the head-on position during the entire running of the race. Thus taken pictures are then correlated and reproduced in a single viewing frame on a television receiving screen or kinescope film.

Another object of this invention is to provide a television reproduction device for races wherein the contestants are continually viewed both head-on from one of a plurality of fixed positions exterior of the track and laterally from a fixed location interior of the track, the picture being immediately reproduced and recorded at a central judge's viewing station.

A feature of this invention resides in the fact that the race may be viewed and recorded in a continuous sequential relationship, both the frontal and side view being synchronized to each other to compensate for the depth distortion in the head-on camera.

Another feature of this invention resides in the fact that the race is viewed and recorded at the same time, no time being lost in making a continuous record of the race.

Other objects and advantages will become apparent upon referring to the accompanying specification and drawings in which similar characters of reference represent corresponding parts of the several views.

FIG. 1 is a diagrammatic view of a race track showing the positions and approximate fields of view of the camera stations employed in the present invention.

FIG. 2 is a schematic view of the control camera and one head-on camera connected to the viewing and recording system employed in my invention.

FIG. 3 is a block diagrammatic view showing the various operative parts of my complete control system.

FIG. 4 illustrates the elevated relationship of the camera to the track.

The essence of the present invention is the provision of spaced television cameras or photographic cameras around the periphery of an oval race track arranged to photograph the racing contestants from a head-on position continuously around the race track while employing a camera in the center of the infield of the track to simultaneously photograph the contestants continuously around the track from a side position. The head-on images of the contestants and the side view images of the contestants are arranged to be simultaneously viewed adjacent one another on a viewing screen or in the same frame of a photographic reproduction such as a kinescopic motion picture film.

In reference to the drawings, FIG. 1 shows a race track which is generally oval in configuration and comprising a track indicated at 2 bounded by inner and outer barriers or rails 3 and 4 defining an infield 5. In accordance with my invention a plurality of spaced cameras are elevated above and positioned around the outside rail of the track in order to photograph the racing contestants from a head-on position continuously throughout the course of the race as pictured in FIG. 1.

I have provided cameras identified as A through F at intervals about the track. The field of camera A as shown diagrammatically covers the track including the home stretch to the finish line and from the starting gate to the first turn. Camera B is focused to include a field covering the first portion of the first turn. Camera C picks up the contestants through the rest of the first turn while camera D takes in the entire back stretch. Camera E covers the first portion of the last turn and camera F covers the portion of the turn not included in the field of view of camera E and thereafter camera A picks up the horses to the finish line.

It is a function of the operator of the various cameras, probably from a remote position, to cut in one camera as the field of view of the preceding camera is completed in respect to the head-on position of the racing contestants. Thus as camera A takes a picture from the start to the first turn, the next camera B then picks up the contestants followed by the remaining cameras C, D, E and F, and lastly by camera A again as it takes the horses from the last turn down to the finish line. In this way there is a continuous photographic presentation of the racing contestants from start to finish showing head-on position of each of the contestants.

The word "camera" is used usually herein to mean a television camera and the word "photograph" is used interchangeably with either direct television or television tape recording or by motion picture photography such as a kinescope. In other words, throughout this specification and claims the employment of the expressions relating to television or photographic reproduction are used sometimes interchangeably and are intended to mean either or both of such systems.

A center camera G is elevated in the middle of the infield and is arranged to be rotated on its axis to view the racing contestants from the starting position to the finish position. In other words, camera G rotates 360°, more or less, depending upon where the relative positions of the starting and finish lines are to cover the total raceway being employed.

In operation, the camera G is focused upon the starting line and photographs the horses entirely around the course of the race track to the finish line while simultaneously cameras A through F are sequentially photographing the same contestants from a frontal position. The fields of view are shown in broken lines in respect to each of the cameras A through F and is intended to illustrate an example of how the horses may be photographed while running in the various sectors of the racing oval. Similarly, broken lines are employed to show the field of view of camera G which is adapted to rotate with the racing contestants during the course of running of the event.

FIG. 2 indicates a schematic view of how the system works showing rotating camera G photographing the racing contestants from a side position while one exterior camera A is employed, as illustrative of each of cameras A through F, and indicating such camera photographing the contestants from a head-on position.

Assuming that cameras G and A are television cameras, the signal from camera A is viewed from a monitor's set 8 while the signal from camera G is viewed from a monitor's set 9. In accordance with this invention the camera G is focused in such a way that its field of view covering the leading racing contestants which are normally viewed as clustered adjacent the inner rail 3 is confined to only approximately 25% of the horizontal section of the screen. Similarly, because the head-on images photographed by cameras A through F are correspondingly greater spread and less confined, camera A is focused to provide the images of the head-on racing animals 7 in about 75% of the screen.

The monitor sets 8 and 9 are useful in adjusting for this division of field of view and may be employed by the operators of the cameras to adjust for this purpose. The image from camera A, which is understood to include the same frontal images which would be received from cameras B, C, D, E and F in their sectors of operation around the course, is then communicated to the conventional screen-splitter 13 as is the picture from camera G.

The screen-splitter 13 then functions in conventional fashion to provide a montage picture as indicated in monitor set 12. The screen-splitter 13 may be of conventional design such as the Dage Model 210 screen-splitter manufactured by Thompson Products, Inc. of Michigan City, Indiana, or any other suitable conventional screen-splitter.

The picture thus reproduced on monitor 12 shows the side view image obtained through camera G in the upper 25% of the screen. The lower approximately 75% of the screen is simultaneously filled with the head-on sequence view of the horses taken by camera A.

For purposes of preservation of a permanent record and convenient reviewing of the judges, a camera 14 may be used to photograph the picture from viewing monitor 12. The film may then be processed by conventional means 15 and then viewed through a projector 16 on a screen 17. The state of the art for film development is such that the film taken by camera 14 of the picture on monitor 12 may be processed for viewing in a very short time by the judges who can conveniently see the results on screen 17 in the judges' room. Thus the judges are enabled to view the results of a race within a very short time; wherein, the side view of the racing animals is seen simultaneously with the head-on views so that an absolute comparison of the relative positions of the animals may be made at all times and without a need for guesswork.

FIG. 3 is a block diagram illustrating each of the cameras A through F connected into the switches arranged for each of the cameras to cut the cameras in and out as the field of view of the racing contestants is completed or started. Each camera A through F can be selectively switched on or off depending upon which of the centrally located monitors 8a through 8f indicates the most informative picture.

As described previously, camera G is continuously operated throughout the entire race revolving about an axis to keep the pack leaders within its viewing angle. A conventional control lever located in central control panel 20 or a predetermined rate signal can automatically control rotation motor 23 over cable 22. The control camera G then sends the continuous picture signal to screen-splitter 13 and in turn to the upper 25% of viewing monitor 12 as previously described. A side view image is also sent to the central monitor 8g for purposes of checking the alignment of the central camera with the pack.

The outer cameras A through F transmit the head-on view of the pack directly to the respective monitors 8a through 8f. All of the monitors are centrally located within the control room and are plainly visible to the operator. By viewing the closely spaced monitor screens all portions can be closely monitored.

Under most circumstances the camera control lever sequentially moves from output cable to output cable of each camera A through F. This way the action of the race is followed from sequential views. By observing monitors 8a through 8f, the skilled operator is able to determine when the action is no longer within the viewing angle of the presently selected camera. At that time he moves selecting lever 24 to the next camera, this sequence being carried out throughout the entire race to produce a continuous picture. This operation could also be carried out automatically by pre-setting the switches to operate at a predetermined rate.

Exterior cameras A through F can contain a motor means which will rotate them about an axis, keeping the race within the field of view of select cameras throughout progress about the track. In this manner the camera having the best view can be kept trained upon the race until the subsequent camera is in relative position to view the same scene. Saving in cameras and equipment will result from this arrangement since fewer cameras will be needed in covering the race.

Each of the two views are transferred to the viewing screen in exact timed synchronism with one another. Since the image from the interior camera is occurring at the same time instant as the image from the exterior camera, no film matching need be done and a composite picture is produced automatically.

It will be understood that various changes in the details and arrangements of parts, which have been herein described and illustrated in order to explain the nature of the invention, may be made by those skilled in the art within the principle and scope of the invention as expressed in the appended claims.

What is claimed is:

1. A device for policing action on race tracks having two arcuate curved ends, two intermediate straightaways, and an infield surrounded by the race path comprising: a plurality of elevated television cameras positioned about the outer edge of the track at preselected spaced intervals, said outer cameras being directed to view adjacent portions of the complete race from a substantially head-on direction; an elevated rotatable camera located centrally within the infield of the track and arranged to revolve in the direction of race travel; and a central viewing station including a screen splitter connected to a viewing screen, each said outer television camera being selectively connected to said screen splitter, said central rotating camera being continuously connected to said screen-splitter, each of said connected cameras transmitting a race image to separate portions of the viewing screen simultaneously to produce composite images thereon consisting of a head-on view and a side view in time synochronism with one another continuously throughout the race.

2. A visual policing system for race tracks of the type having at least one curved portion comprising: a plurality of elevated stationary television cameras spaced along the exterior periphery of the race track; each of said cameras being directed to view a separate portion of the track from a predominantly head-on race direction; an elevated rotatable television camera controllably pivoted about a stationary axis in the interior of the track; and a central control station including a viewing and recording means and a control means, said control means being operable both to selectively receive the image signal from any one of said non-movable cameras and to continuously receive the image signal from said rotatable camera and simultaneously transmit both of said signals to separate portions of the viewing and recording means; the recording means permanently reproducing the head-on and side view on separate portions of the image reproducing area, the portion of the area containing the side view being limited to approximately a horizontal 25% of the total area, and the remainder of the area containing the head-on view.

3. A system for sequentially viewing the complete race on a substantially oval race track having two arcuate curved ends, two intermediate straightaways and an infield surrounded by the race path comprising: a plurality of elevated exterior television cameras each being controlled to follow a portion of the race and directed to view adjacent sectors of the complete track from a predominantly frontal race position; an elevated rotatable television camera pivoted about a fixed vertical axis in the infield portion of the track, said rotatable camera being directed to view the complete track from a transverse direction; a central control station including a viewing screen and recording means connected in operable relationship to a screen-splitter, said rotatable camera being connected to a viewing monitor and to said screen-splitter, said control station being connected to said rotatable cameras to signal the amount of rotation needed to keep the race in view, said exterior cameras being connected to viewing monitors and to said screen-splitter through a selector switch, the selector switch transmitting the image signal to the screen-splitter from one of said non-movable cameras at a time, said screen-splitter simultaneously projecting the image received from the selected exterior camera and the rotating camera to separate portions of the screen.

4. A race track monitoring system for sequentially viewing at a remote observation point, sectors of a closed track having two arcuate curved ends, two intermediate straightaways and an infield surrounded by the race path comprising: a plurality of spaced television cameras positioned around the track at spaced intervals and directed to cumulatively include all of the racing path and to photograph the racing contestants from a head-on position, at least one of said spaced cameras being directed lengthwise of a first straightaway, at least one camera of said spaced cameras directed tangentially to the curvature of the first turn, another of said spaced cameras being directed lengthwise of the back stretch, at least one more of said spaced cameras being directed tangential to the curvature of the second turn; a rotating television camera positioned in a fixed axis in the infield of the track; a control center including: a viewing monitor connected for each of said cameras, a selector switch connected to the signal cables of said spaced cameras, a rotation control means connected to said rotating camera, a screen-splitter connected to a viewing screen and an image recording means, said selector switch connecting said spaced cameras to the screen-splitter one at a time to create a sequential head-on view image of the race, said rotating camera being continuously connected to said screen-splitter to create a continuous side view image of the race, said screen-splitter transmitting the front view to approximately 75% of the viewing screen and the side view to the remaining area of the viewing screen; image recording means positioned adjacent said viewing screen to permanently record the image for processing and later reviewing.

5. A method for immediately viewing a closed circuit race track from a remote observation position with a photographing system comprising the steps of: continuously photographing the race track from an elevated side position in the infield portion of the track, photographing the track from a predominantly head-on race position; simultaneously producing both side and head-on view in synchronism with one another at the remote observation position on the same viewing screen, continuously sequentially photographing an adjacent sector of the track from both a head-on and side position as the race moves out of the range of preceding views.

6. A method for immediately viewing a race track including the type having two arcuate curved ends, two intermediate straightaways and an infield surrounded by the race path at a remote observation screen comprising the steps of: continuously viewing the race from a predominantly head-on position; simultaneously viewing the same scene from a side position; immediately transmitting both head-on and side views to separate portions of the same viewing screen in time synchronism with one another for simultaneous viewing, and then, recording the images from the screen for later viewing.

7. A continuous record of the running of a race including: a side view of the race taken continuously from the same rotating vantage point; a predominantly head-on view of the race taken sequentially from a plurality of fixed vantage points; the side view and the head-on view being instantaneously and simultaneously recorded on separate portions of a single image reproduction area, each of the views being in exact time synchronism with one another and the composite images providing a continuous record of the race.

8. A continuous record of the running of a race according to claim 7 and wherein the side view image fills a minor part of the image reproduction area and the head-on view fills the remaining portion thereof.

9. A device for policing action on race tracks having two arcuate curved ends, two intermediate straightaways, and an infield surrounded by the race path comprising: a plurality of elevated television cameras positioned about the outer edge of the track at preselected spaced intervals, said outer cameras being directed to view adjacent portions of the complete race from a substantially head-on direction; an elevated rotatable camera located centrally within the infield of the track and arranged to revolve in the direction of race travel; and a central viewing station including a screen splitter connected to a viewing screen, each said outer television camera being selectively connected to said screen splitter, said central rotating camera being continuously connected to said screen-splitter, each of said connected cameras transmitting a race image to separate portions of the viewing screen simultaneously to produce composite images thereon consisting of a head-on view and a side view in time synchronism with one another continuously throughout the race; and means for continuously recording the composite image on said viewing screen.

References Cited by the Examiner

UNITED STATES PATENTS

| 2,164,297 | 6/39 | Bedford | 178—6 |
| 2,269,862 | 1/42 | Rose | 178—6 |
| 2,587,018 | 2/52 | Weisfeldt | 178—6 |
| 2,943,141 | 6/60 | Knight | 178—6.5 |

DAVID G. REDINBAUGH, *Primary Examiner.*